(12) United States Patent
Winkler et al.

(10) Patent No.: US 11,142,240 B2
(45) Date of Patent: Oct. 12, 2021

(54) HYDRAULIC UNIT, METHOD FOR OPERATING A HYDRAULIC UNIT, AND STEERING SYSTEM

(71) Applicant: Weber-Hydraulik GmbH, Gueglingen (DE)

(72) Inventors: Torsten Winkler, Pfaffenhofen (DE); Ralf Naumann, Pfaffenhofen (DE)

(73) Assignee: Weber-Hydraulik GmbH, Gueglingen (DE)

( * ) Notice: Subject to any disclaimer, the term of this patent is extended or adjusted under 35 U.S.C. 154(b) by 123 days.

(21) Appl. No.: 16/141,023

(22) Filed: Sep. 25, 2018

(65) Prior Publication Data
US 2019/0100240 A1 Apr. 4, 2019

(30) Foreign Application Priority Data
Sep. 26, 2017 (DE) .................... 102017122 235.9

(51) Int. Cl.
*B62D 5/12* (2006.01)
*B62D 5/065* (2006.01)
*B62D 7/14* (2006.01)
*B62D 5/06* (2006.01)

(52) U.S. Cl.
CPC .............. *B62D 5/12* (2013.01); *B62D 5/064* (2013.01); *B62D 5/065* (2013.01); *B62D 7/144* (2013.01); *B62D 7/148* (2013.01)

(58) Field of Classification Search
CPC .......... B62D 5/12; B62D 5/064; B62D 5/091; B62D 5/093; B62D 5/065; B62D 5/30; B62D 5/32; B62D 7/144; B62D 7/148

USPC ....... 180/403, 406, 417, 432, 433, 438, 441, 180/442
See application file for complete search history.

(56) References Cited

U.S. PATENT DOCUMENTS 2,334,918 A * 11/1943 French .................... B62D 5/06
180/406
3,556,242 A * 1/1971 Dollase ................. B62D 5/093
180/406
(Continued)

FOREIGN PATENT DOCUMENTS

| DE | 10037829 | 2/2002 |
| EP | 1944514 | 7/2008 |
| EP | 2927093 | 10/2015 |

*Primary Examiner* — Anne Marie M Boehler
(74) *Attorney, Agent, or Firm* — Volpe Koenig

(57) ABSTRACT

A hydraulic unit for supplying pressure to a hydraulic steering system is provided having at least two hydraulic cylinders and at least one hydraulic pump (9, 10, 32, 33). It is essential that the hydraulic cylinders are of interacting configuration, by an annular space (6a, 6a, 28a, 28b) of the first hydraulic cylinder being connected via at least one hydraulic line to an annular space (6a, 6a, 28a, 28b) of the second hydraulic cylinder, and a piston space (5a, 5b, 29a, 29b) of the first hydraulic cylinder being connected via at least one hydraulic line to a piston space (5a, 5b, 29a, 29b) of the second hydraulic cylinder, and a hydraulic pump (9, 10, 32, 33) being arranged at least in a hydraulic line (7, 8, 30, 31) between the two annular spaces (6a, 6a, 28a, 28b) or in a hydraulic line (7, 8, 30, 31) between the two piston spaces (5a, 5b, 29a, 29b). Furthermore, the invention relates to methods for operating a hydraulic unit for supplying pressure to a hydraulic steering system, and to a steering system.

8 Claims, 4 Drawing Sheets

(56) References Cited

U.S. PATENT DOCUMENTS

| | | | | |
|---|---|---|---|---|
| 3,583,282 A * | 6/1971 | Cope | ................ | F15B 11/22 91/25 |
| 3,589,465 A * | 6/1971 | Harding | ................ | B62D 5/09 180/432 |
| 4,184,332 A * | 1/1980 | Liebert | ................ | B62D 5/09 180/403 |
| 4,237,994 A * | 12/1980 | McColl | ................ | B62D 53/005 180/179 |
| 4,405,030 A * | 9/1983 | Wittren | ................ | B62D 5/09 180/433 |
| 4,531,604 A * | 7/1985 | Lamer | ................ | B60P 3/1091 180/432 |
| 6,279,675 B1 * | 8/2001 | Bohner | ................ | B62D 5/003 180/403 |
| 6,550,566 B1 * | 4/2003 | Engelbrecht | ................ | B62D 5/09 180/432 |
| 7,044,262 B2 * | 5/2006 | Otaki | ................ | B62D 5/065 180/422 |
| 7,364,482 B1 * | 4/2008 | Wong | ................ | B63H 25/28 440/1 |
| 7,537,079 B2 * | 5/2009 | Krieger | ................ | B62D 5/061 180/414 |
| 8,066,091 B2 * | 11/2011 | Ito | ................ | B62D 3/14 180/403 |
| 2010/0147618 A1 * | 6/2010 | Osonoi | ................ | B62D 5/003 180/403 |
| 2016/0068182 A1 * | 3/2016 | Becker | ................ | B62D 5/18 180/403 |

* cited by examiner

HYDRAULIC UNIT, METHOD FOR OPERATING A HYDRAULIC UNIT, AND STEERING SYSTEM

INCORPORATION BY REFERENCE

The following documents are incorporated herein by reference as if fully set forth: German Patent Application 10 2017 122 235.9, filed Sep. 26, 2017.

BACKGROUND

The present invention relates to a hydraulic unit for supplying pressure to a hydraulic steering system, to a method for operating a hydraulic unit for supplying pressure to a hydraulic steering system, and to a steering system.

Steering systems in motor vehicles nowadays usually have hydraulic steering servo units. To this end, hydraulic power steering pumps are used in hydraulic steering systems for the power assistance of the steering movement.

Safety is a decisive factor, in particular, in the field of steering. In order not to risk any blockage of the complete steering system in the case of a failure of individual components, safety mechanisms are usually provided. In addition, a mechanical through-connected drive to the front axle of the steering system should be possible for the case of a disruption. In particular in the case of vehicles with a high axle load, however, a mechanical steering system of this type is extremely stiff and difficult to handle. Here, hydraulic steering systems make flexible concepts possible with safety mechanisms which make the steering system more reliable and more safe.

In general, there are different use areas for corresponding steering systems, which use areas can be distinguished according to the location of the installation and the type of vehicle. In the case of the location of the installation, a distinction is made in principle between the front axle and the rear axle; steered second front axles also fall within this. Steered rear axles are in turn divided into leading and trailing axles, depending on whether the installation location lies in front of or behind the driven axle.

Finally, the type of vehicle differs in terms of the permissible maximum speed which then entails different requirements of the respective safety concepts.

It is known from the prior art to use differential cylinders which are connected on one side to the steering arm and on the other side to the axle of the vehicle, with the result that the cylinder lies without transverse forces in the force flow. It is disadvantageous, however, that active areas of different size are present on the annular space side and on the piston side in the case of differential cylinders, with the result that an adapted design of the pressure supply is necessary for identical speeds in both directions, and this ultimately results in an impaired degree of efficiency, since the pressure supply has to be designed for the two benchmarks of great volumetric flow and small pressure (piston space), and small volumetric flow with high pressure (annular space). As a rule, this design takes place with an identical hydraulic performance for both directions using a virtual operating point, and leads to the following benchmarks:

in order for it to be possible to provide the requested force by way of the cylinder, a higher pressure is required in the annular space than in the associated piston space. This then requires a higher torque on the motor side.

In order for it to be possible to provide the predefined steering speed, a greater volumetric flow is in turn required in the piston space than in the annular space. This requires a higher rotational speed on the motor side.

As a result of said two benchmarks, a motor is required which is to be designed for the respective extreme values both for rotational speed and for torque. This then necessarily leads to a pressure supply which can also provide the high pressure in the case of a great volumetric flow. The abovementioned virtual operating point does not exist in this form, however, and therefore leads to oversizing of the pressure supply. The resultant requirements on the motor have a direct influence on the overall size and possibly also on the degree of efficiency of the motor.

As an alternative, it is known to use synchronous cylinders which in each case have active areas of identical size. It is disadvantageous in the case of this solution, however, that a connection of the cylinder tube and the vehicle axle and of the piston rod and steering arms is necessary, which connection leads to transverse forces in a manner which is dependent on the angle of attack of the steering arms on the piston rod. Therefore, piston rods having a greater diameter are required, in order for it to be possible to withstand the transverse forces which occur. In order for it to be possible for identical forces to be generated in the case of a then greater diameter of the piston rod at predefined pressures, the cylinder diameter necessarily likewise has to become greater.

SUMMARY

The invention is therefore based on the object of providing a hydraulic unit and a method and a steering system with an increased reliability and efficiency and with a low installation space requirement.

The abovementioned object is achieved by way of a hydraulic unit, a method, and a steering system having one or more features of the invention. Advantageous refinements are found below and in the claims.

The hydraulic unit according to the invention is preferably configured for carrying out the method according to the invention and/or one preferred embodiment of the method according to the invention. The method according to the invention is preferably configured for being carried out by a hydraulic unit according to the invention and/or a preferred embodiment of a hydraulic unit according to the invention.

The hydraulic unit is configured for supplying pressure to a hydraulic steering system, and has at least two hydraulic cylinders and at least one hydraulic pump.

It is essential that the hydraulic cylinders are of interacting configuration, by an annular space of the first hydraulic cylinder being connected via at least one hydraulic line to an annular space of the second hydraulic cylinder, and a piston space of the first hydraulic cylinder being connected via at least one hydraulic line to a piston space of the second hydraulic cylinder, and a hydraulic pump being arranged at least in a hydraulic line between the two annular spaces or in a hydraulic line between the two piston spaces.

The hydraulic cylinders are therefore arranged so as to run in opposite directions with respect to one another, such that an expansion of the one hydraulic cylinder, for example in the case of a steering movement of a vehicle, results in a compression of the other hydraulic cylinder. This likewise applies to the respective identical spaces: if the annular space side of the one hydraulic cylinder expands, the annular space side of the other hydraulic cylinder is compressed. At the same time, the piston side of the one hydraulic cylinder is compressed, whereas the piston side of the other hydraulic cylinder expands.

The invention differs in terms of essential aspects from the previously known solutions from the prior art: the actuation of the hydraulic unit does not take place by hydraulic cylinder; rather, in each case two identical spaces of the two hydraulic cylinders are connected via hydraulic lines, that is to say the annular space side of the one hydraulic cylinder is connected to the annular space side of the other hydraulic cylinder via a hydraulic line, and hydraulic liquid can thus be exchanged between said two spaces. At the same time, the piston side of the one hydraulic cylinder is connected to the piston side of the other hydraulic cylinder via a hydraulic line, with the result that hydraulic liquid can also be exchanged between said two spaces.

In the case of a steering movement, both volumetric flows in the hydraulic lines are always flowing between the respective identical spaces of the hydraulic cylinders as a result of the volume changes of the spaces in the two hydraulic cylinders.

In addition, a hydraulic pump for pumping hydraulic liquid is provided at least in one of the two hydraulic lines, that is to say between the two annular spaces and/or between the two piston spaces.

This results in the advantage that the pressure supply acts on areas of respectively identical size in a manner which is directionally independent, since the pressure supply acts in each case on the piston faces and/or the annular faces of the hydraulic cylinders. The pressure supply can thus be designed in an optimum manner with regard to the energy requirement. In comparison with the motors which are required in the prior art and are to be designed for the respective extreme values both with regard to the rotational speed and the torque, smaller and more efficient motors can be used according to the invention in a targeted manner. This has a direct influence on the overall size and possibly also on the degree of efficiency of the motor.

Within the context of this description, the term "pressure supply" comprises at least one hydraulic pump and at least one drive motor for the hydraulic pump. Disruptions of the pressure supply can affect the hydraulic pump or the drive motor, and the hydraulic pump and the drive motor.

In one preferred embodiment of the invention, the hydraulic unit comprises a second hydraulic pump. The two hydraulic pumps are arranged in each case in the hydraulic lines between the respective identical spaces of the hydraulic cylinders. Therefore, one hydraulic pump is arranged in the hydraulic line between the two annular spaces, and one hydraulic pump is arranged in the hydraulic line between the two piston spaces. This results in the advantage that the pressure supply can be distributed to the two hydraulic lines and, as a result, all possible action areas, that is to say both firstly the piston faces and secondly the annular faces of the two cylinders, can be utilized. Increased safety is achieved by way of the redundancy of the two independent pressure supplies, which additional safety allows the fundamental steering function (with a reduced performance, however) to be maintained in the case of a failure of one of the two pressure supplies, since a basic pressure supply is ensured by way of the remaining hydraulic pump or pressure supply even in the case of a failure or disruption of one of the two hydraulic pumps or pressure supplies.

In one preferred embodiment of the invention, the hydraulic cylinders are configured as differential cylinders. The hydraulic cylinders are preferably configured as identical differential cylinders. Differential cylinders can be of compact configuration, since no continuous piston rod is necessary, and are inexpensive. Moreover, no transverse forces occur in the case of differential cylinders having their typically used attachment elements in steering applications. Furthermore, this type of cylinders can be equipped in a simple way with an integrated measuring system.

By way of the invention, all advantages of differential cylinders can be utilized, whereas at the same time the advantages which are actually customary in the case of synchronous cylinders of active areas of identical size and therefore energy efficiency are also present.

In one preferred embodiment of the invention, the hydraulic unit comprises at least one valve arrangement. The valve arrangement is arranged in an operative connection with the hydraulic line which comprises the hydraulic pump. Here, the valve arrangement comprises at least one valve which makes the throughflow of the hydraulic liquid possible in the open position and blocks the throughflow of the hydraulic liquid in the closed position, and hydraulic lines which lead to the valve and lead away from the valve.

A small oil loss can preferably be compensated for by way of the integration of a replenishing possibility in the hydraulic circuit. The replenishing possibility makes replenishing of hydraulic liquid possible, as long as an oil loss (leak) should occur in one of the two connected oil spaces, for example oil loss via the piston seals. Using the correction possibility of the replenishing possibility, the cylinders can be considered to be redundant systems.

The replenishing possibility is preferably realized as a further additional function of the valve arrangement. The replenishing possibility can be configured as known from the prior art.

The valve arrangement is arranged and configured in such a way that the hydraulic liquid can flow via the valve arrangement and can thus bypass the hydraulic pump. The valve arrangement therefore represents an alternative path for the hydraulic liquid. In a first closed position of the valve of the valve arrangement, the alternative path via the valve arrangement is closed and the hydraulic liquid flows via the hydraulic pump, there then being the possibility of also integrating a replenishing functionality. In a second open position of the valve of the valve arrangement, the path for the hydraulic liquid via the valve arrangement is open and the hydraulic liquid flows via the valve arrangement.

In this case, the hydraulic liquid can flow freely back and forth between the two identical spaces of the hydraulic cylinders. This part of the hydraulic unit then no longer provides a resistance or assistance for the steering system. In this case, the second part of the hydraulic unit operates on its own. If no hydraulic pump is provided in the second part of the hydraulic unit, a free exchange of the hydraulic liquid between the two identical spaces of the hydraulic cylinders is also possible here. In this case of the hydraulic unit being switched off with a lack of influence, the steering system is free.

The hydraulic unit preferably comprises at least two valve arrangements, one valve arrangement being arranged in the hydraulic line between the two annular spaces, and one valve arrangement being arranged in the hydraulic line between the two piston spaces. In the case of a failure of the systems, an activation can therefore take place via the two valve arrangements, with the result that the steering system does not block or counter-steer even in the case of a disruption.

The method according to the invention is designed for operating a hydraulic unit for supplying pressure to a hydraulic steering system, and is carried out by way of at least two hydraulic cylinders and at least one hydraulic pump.

It is essential that in each case two identical spaces of the hydraulic cylinders are connected via hydraulic lines and, in the case of a steering movement, hydraulic liquid flows between the identical spaces, the hydraulic liquid being pumped by a hydraulic pump in at least one of the two hydraulic lines.

Within the context of this description, "two identical spaces of the hydraulic cylinders" means that the hydraulic cylinders in each case comprise an annular space and a piston space. The two annular spaces of the two hydraulic cylinders are therefore identical. The two piston spaces of the two hydraulic cylinders are likewise identical. There is therefore a connection between the annular space of the one hydraulic cylinder and the annular space of the other hydraulic cylinder, and a connection between the piston space of the one hydraulic cylinder and the piston space of the other hydraulic cylinder. The connection takes place via hydraulic lines which can be both continuous and in multiple pieces.

The method according to the invention likewise has the abovementioned advantages of the hydraulic unit according to the invention.

One preferred refinement of the method according to the invention provides that, in the case of a malfunction, the hydraulic pump in the hydraulic line is bypassed by a valve arrangement. The valve arrangement comprises a valve and hydraulic lines. Here, the valve can enable or block a throughflow of the hydraulic liquid in an open or closed manner depending on the valve position. In the case of a disruption, the valve position can be set to open, with the result that a throughflow is possible and the hydraulic liquid can flow via the valve arrangement between the identical spaces of the hydraulic cylinders. As a result, the faulty pressure supply is bypassed and a blockage or counter-steering operation does not occur.

The steering system according to the invention is designed for a front axle. The steering system comprises at least two steering arms, at least two hydraulic cylinders and at least one hydraulic pump. The steering system is preferably designed for a steered second front axle.

It is essential that the two hydraulic cylinders are connected by way of in each case the same cylinder side on the front axle and in each case by way of the other cylinder side to in each case one of the two steering arms. In other words, the hydraulic cylinders are both connected either on the annular space side to the respective steering arm and on the piston side to the second front axle or, vice versa, are connected on the annular space side to the second front axle and on the piston side to the respective steering arm. Furthermore, the annular space of the first hydraulic cylinder is connected via at least one hydraulic line to the annular space of the second hydraulic cylinder, and the piston space of the first hydraulic cylinder is connected via at least one hydraulic line to the piston space of the second hydraulic cylinder, with the result that the respective identical spaces of the two hydraulic cylinders are connected to one another via hydraulic lines. A hydraulic pump is arranged at least in one of the hydraulic lines between the two annular spaces, or in a hydraulic line between the two piston spaces.

A hydraulic pump is preferably arranged in each case in the two hydraulic lines. Therefore, the two identical spaces of the hydraulic cylinders are in each case connected via hydraulic lines, a hydraulic pump being provided in each case between the identical spaces in the hydraulic line.

The steering system preferably has a coupling via a connecting track rod for the relevant axle. Via the connecting track rod, in the case of a disruption, the force can be transmitted from the side with the functioning pressure supply to the other wheel.

The steering system according to the invention likewise has the abovementioned advantages of the hydraulic unit according to the invention and of the method according to the invention.

The hydraulic unit according to the invention is suitable, in particular, for the supply of pressure in a hydraulic steering system for commercial vehicles, construction vehicles, agricultural vehicles or transport vehicles. Here, the hydraulic unit according to the invention contributes, in particular, to the increase of the safety in the case of a disruption. In the case of the use for the steering system of a steered second front axle, in particular, disruptive events can be reacted to reliably and in multiple stages by way of the hydraulic unit according to the invention. The use is also possible, however, for application of the first steered front axle, if the vehicle architecture makes a complete redundancy possible (independent power supplies and independent ECUs). For vehicles with a design-induced maximum speed of less than 80 km/h, the steering system according to the invention can likewise be used as a steer-by-wire solution.

BRIEF DESCRIPTION OF THE DRAWINGS

Further preferred features and embodiments of the invention will be described in the following text using exemplary embodiments and the figures, in which.

DETAILED DESCRIPTION

In FIGS. 1 to 4, identical designations denote elements which are identical or act identically.

Figure 1:
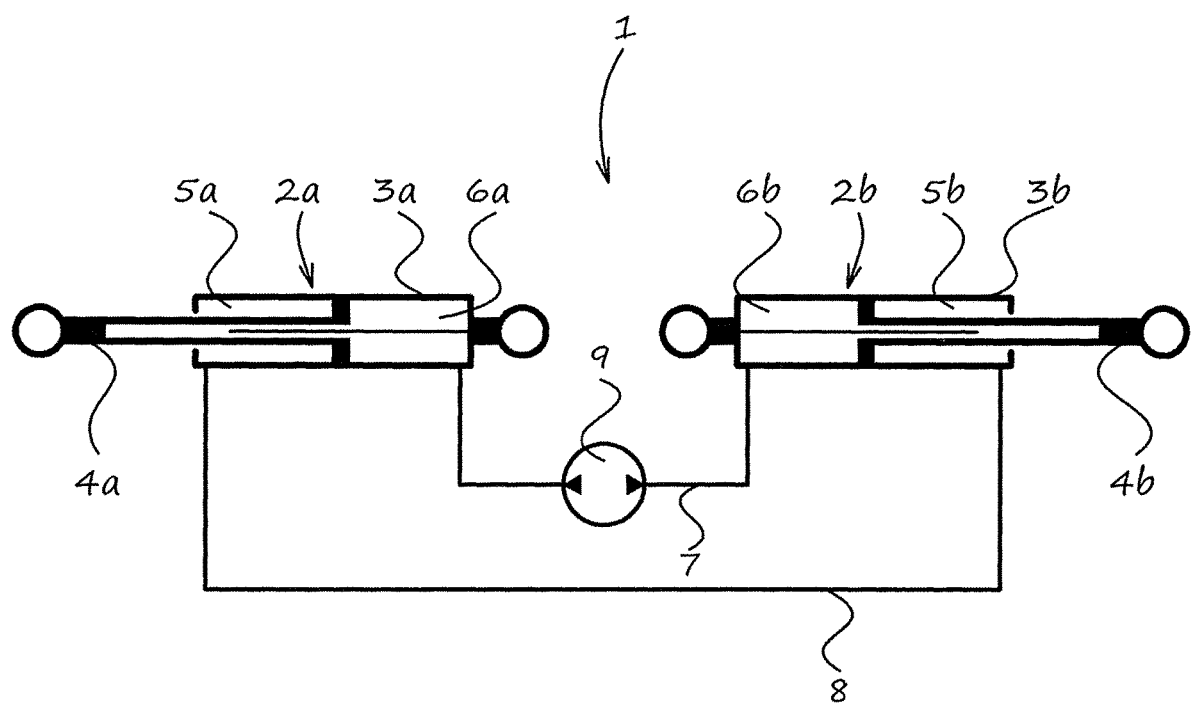
FIG. 1 shows a diagrammatic illustration of a first exemplary embodiment of a hydraulic unit according to the invention.

FIG. 1 shows a diagrammatic illustration of a first exemplary embodiment of the invention of a hydraulic unit 1 according to the invention.

The hydraulic unit 1 comprises two hydraulic cylinders 2a, 2b. The hydraulic cylinders 2a, 2b are configured as differential cylinders, in the present case as identical differential cylinders.

The two hydraulic cylinders 2a, 2b in each case have a cylinder tube 3a, 3b and a piston 4a, 4b. As a result, two volumes are formed in each case in the hydraulic cylinders: the piston side 5a, 5b and the annular space side 6a, 6b. The two hydraulic cylinders are connected to one another via two hydraulic lines 7, 8. The hydraulic lines 7, 8 connect in each case two identical spaces 5a, 5b and 6a, 6b, respectively, of the two hydraulic cylinders 2a, 2b.

The piston space 5a of the first hydraulic cylinder 2a is connected via the hydraulic line 8 to the piston space 5b of the second hydraulic cylinder 2b.

The annular space 6a of the first hydraulic cylinder 2a is connected via the hydraulic line 7 to the annular space 6b of the hydraulic cylinder 2b.

A hydraulic pump 9 is arranged in the hydraulic line 7. The hydraulic pump 9 is part of the pressure supply which comprises the hydraulic pump and a drive motor (not shown). In the present case, the drive motor is configured as an electric motor.

The volumes 5a, 6a, 5b, 6b change in the case of a movement of the pistons in the hydraulic cylinders. The piston 4a of the hydraulic cylinder 2a is pushed, for example, into the cylinder 3a. The annular space 6a is reduced in size and the piston space 5a is increased in size. At the same time, the piston 4b is pushed out of the cylinder 3b. The annular space 6b is increased in size and the piston space 5b is reduced in size. In the case of this movement, hydraulic liquid flows from the annular space 6a via the hydraulic line 7 and the pump 9 into the annular space 6b. Since the two hydraulic cylinders are of identical configuration, the pressure of the hydraulic liquid acts in each case on the identical annular area. The movement of the hydraulic cylinders is generated by way of the provision of the hydraulic power (pressure and volumetric flow) by the hydraulic pump 9.

At the same time, the volume of the piston space 5a increases in size, and the piston of the second hydraulic cylinder 2b is pushed out of the cylinder 3b, and the volume of the piston space 5b is reduced in size. The hydraulic liquid flows from the piston space 5b via the hydraulic line 8 into the piston space 5a.

Figure 2:
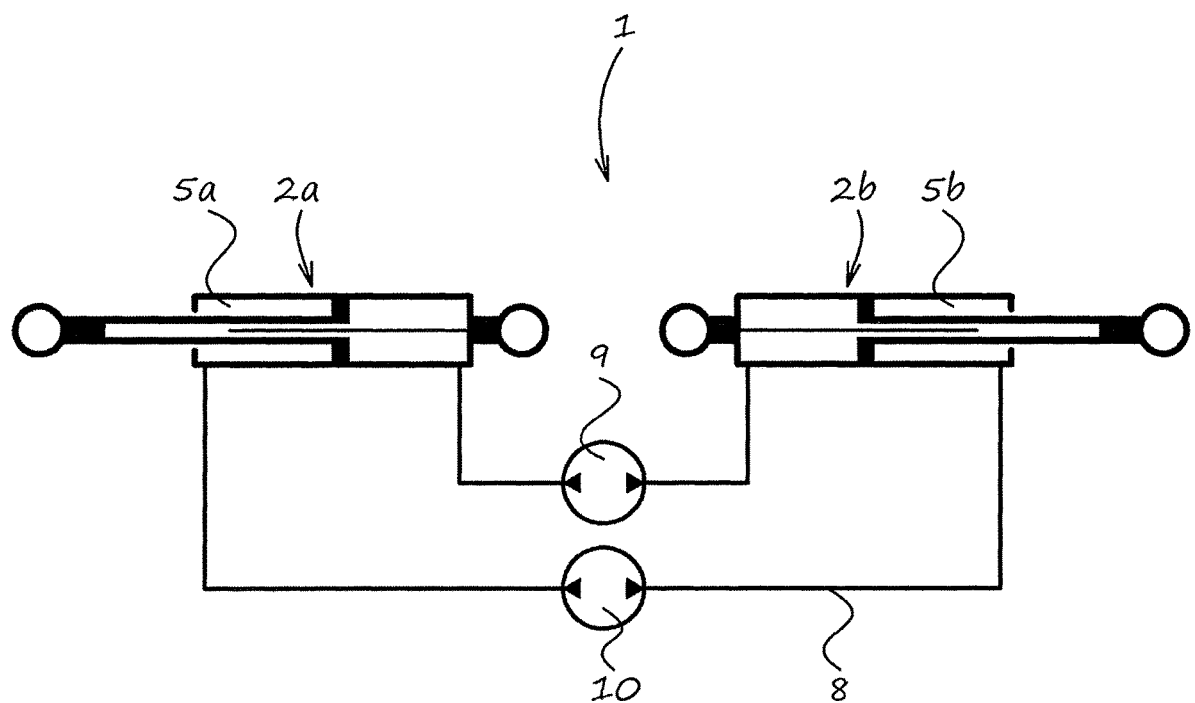
FIG. 2 shows a diagrammatic illustration of a second exemplary embodiment of a hydraulic unit according to the invention.

FIG. 2 shows a diagrammatic illustration of a second embodiment of the invention.

In order to avoid unnecessary repetitions, merely the differences between the figures are to be described in the following text.

In addition to the components from FIG. 1, the hydraulic unit which is shown in FIG. 2 comprises a second hydraulic pump 10. Said second hydraulic pump is arranged in the hydraulic line 8 between the piston space 5a of the one hydraulic cylinder and the piston space 5b of the second hydraulic cylinder. The hydraulic pump 10 is part of a second pressure supply which comprises the hydraulic pump 10 and a drive motor (not shown). In the present case, the drive motor is configured as an electric motor.

By way of the second hydraulic pump 10, the hydraulic pressure can be adapted via a corresponding adaptation of the pump delivery volume in such a way that, in the case of an identical hydraulic power, the ratio of the area differences between the annular face and the piston face in the pump is depicted exactly, and thus an addition of the hydraulic power is made possible in the case of an optimum utilization both of the hydraulic pump and of the drive motor.

In the case of a failure or disruption of one of the two hydraulic pumps 9, 10 (pressure supplies), a basic pressure supply is ensured by way of the remaining hydraulic pump. This makes a minimum functionality of the steering system possible even in the case of a disruption.

Figure 3:
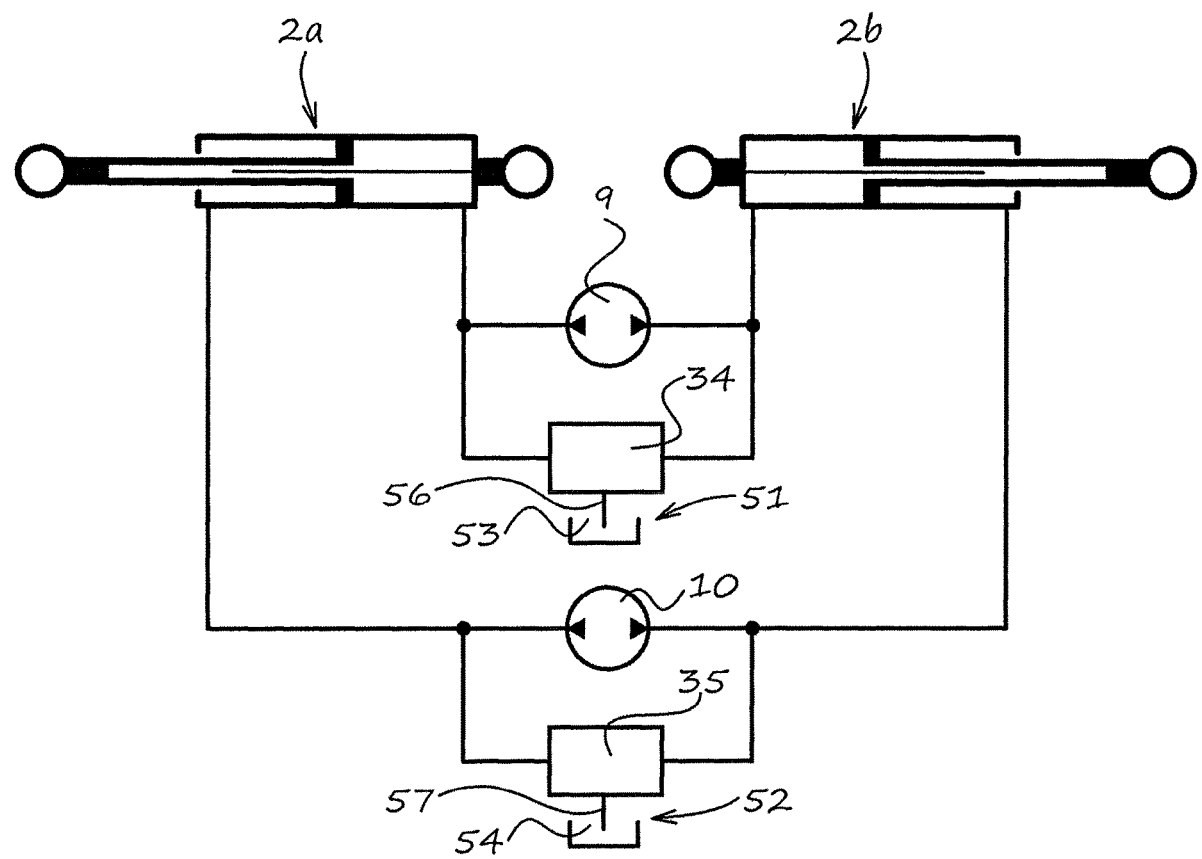
FIG. 3 shows a diagrammatic illustration of a third exemplary embodiment of a hydraulic unit according to the invention.

FIG. 3 shows a diagrammatic illustration of a third embodiment of the invention.

In FIG. 3, a replenishing functionality 51, 52 is provided in addition for each of the two pressure supplies by way of the hydraulic pumps 9, 10. In the case of a leak (internal or external) in the hydraulic circuit, the loss of hydraulic liquid can be compensated for via a reservoir 53, 54 of the replenishing functionality 51, 52.

In the present case, the replenishing functionalities 51, 52 in each case comprise a reservoir 53, 54 for the hydraulic liquid, and are configured in the present case as part of the valve arrangements 34, 35. The reservoirs 53, 54 for the hydraulic liquid and the respective associated valve arrangements 34, 35 are connected via hydraulic lines 56, 57.

For example, an oil loss via the piston seals can be compensated for by way of the replenishing functionality 51, 52, and hydraulic softening of the hydraulic cylinder can thus be avoided.

Figure 4:
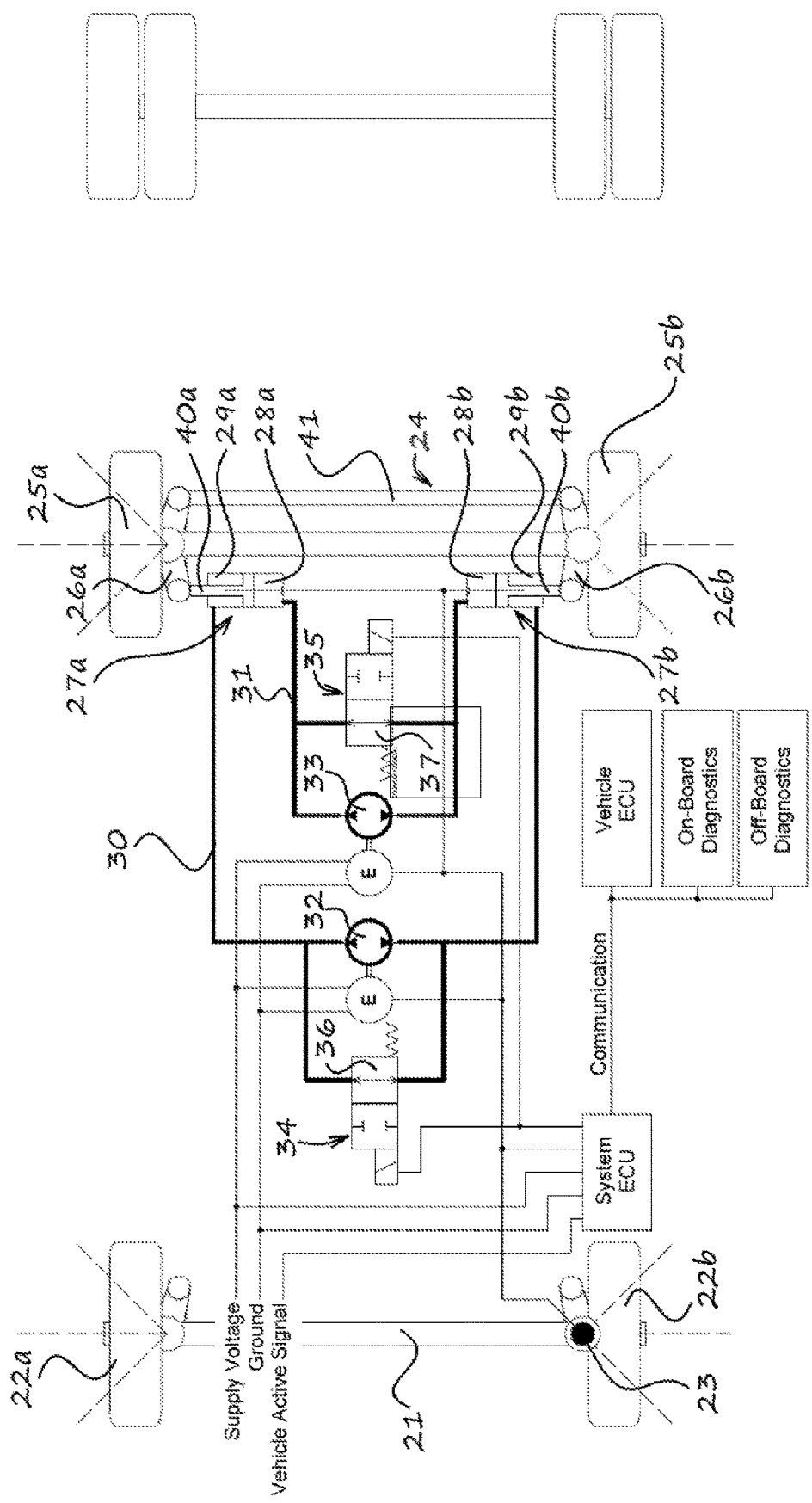
FIG. 4 shows a diagrammatic illustration of a first exemplary embodiment of a steering system according to the invention for a steered second front axle.

FIG. 4 shows a diagrammatic illustration of one embodiment of a steering system according to the invention for a steering system for a steered second front axle 24, which is shown to the rear of the first steered front axle 21.

FIG. 4 shows the first steered front axle 21 with the wheels 22a, 22b. The first front axle is steered via the steering system 23. The latter can be configured as a conventional steering system with a mechanical coupling as a failsafe mode. In this case, said first steered front axle is independent of the second steered front axle and accordingly has no mechanical coupling at all.

The second front axle 24 connects the wheels 25a and 25b. Steering arms 26a, 26b are provided on the wheels 25a and 25b. Said steering arms 26a, 26b are moved via hydraulic cylinders 27a, 27b. The hydraulic cylinders 27a, 27b are configured as described with respect to FIG. 1. In the present case, the pistons 40a, 40b of the hydraulic cylinders 27a, 27b are connected in each case to the steering arms 26a, 26b.

Furthermore, the steering system comprises a connecting track rod 41. The connecting track rod 41 connects the wheels 25a, 25b via the steering arms 26a, 26b as a rigid connection. This results in a non-positive operative connection between the two wheels 26a, 26b.

In the present case, the respective identical spaces of the two hydraulic cylinders 27a, 27b are connected via hydraulic lines 30, 31, that is to say the annular space 28a is connected to the annular space 28b and the piston space 29a is connected to the piston space 29b.

A pump 32, 33 is provided in each case in the course of the hydraulic lines 30, 31.

In order to bypass the pump 32, 33 in the case of a disruption, a valve arrangement 34, 35 is provided in the two hydraulic lines 30, 31. The valve arrangement comprises hydraulic lines which are connected to the hydraulic lines 30, 31, and in each case one valve 36, 37. The hydraulic pumps 32, 33 and the valve arrangements 34, 35 therefore produce alternative paths which the hydraulic liquid can take in a manner which is dependent on the position of the valve 36, 37.

If the valve 36, 37 shuts off the throughflow for the hydraulic liquid, the hydraulic liquid flows via the hydraulic pump. If the valve is open, that is to say a throughflow of the hydraulic liquid is possible, the hydraulic liquid preferably flows via the valve arrangement and therefore bypasses the hydraulic pump.

In the case of a disruption of the hydraulic pumps, the valve position can therefore be switched over, with the result that the hydraulic liquid can flow freely via the valve arrangement and no blocking or counter-steering takes place despite a malfunction of the hydraulic pump.

Since the hydraulic unit is of redundant construction with two hydraulic pumps, one hydraulic pump can be switched off in the case of the failure of said hydraulic pump, that is to say can be bypassed via the valve arrangement, and the remaining hydraulic pump can further assist the steering system. In this case, the force is transmitted via the connecting track rod 41 from the side with the functioning hydraulic pump (and therefore the functioning pressure supply) to the other wheel.

If, for example, the hydraulic pump 32 has therefore failed, the valve 36 is set to open. The hydraulic liquid no longer flows via the hydraulic pump 32 between the piston space 29a and 29b of the two hydraulic cylinders 27a, 27b, but rather via the valve arrangement 34. The hydraulic liquid flows freely, that is to say without blocking but also without an additional pressure supply.

The remaining hydraulic pump 33 makes the supply of pressure and therefore the boosting of the steering movement in a direction of one of the wheels 25a possible. Said movement is also transmitted to the wheel 25b via the connecting track rod 41. This makes a minimum functionality of the steering system possible even in the case of a disruption.

In the present case, the standard position of the valves is closed, that is to say no throughflow of the hydraulic liquid can take place, but rather the hydraulic liquid has to flow via the hydraulic pumps.

The valve position is switched over to open merely in the case of a disruption, with the result that the hydraulic liquid can flow through the valve. In the state of said switch-off without influence, the second front axle is free and follows the steering system of the first axle.

The invention claimed is:

1. A hydraulic unit (1) for supplying pressure to a hydraulic steering system, the hydraulic unit comprising:
    at least two hydraulic cylinders (2a, 2b, 27a, 27b), the hydraulic cylinders (2a, 2b, 27a, 27b) are of interacting configuration, with an annular space (6a, 6a, 28a, 28b) of the first hydraulic cylinder (2a, 2b, 27a, 27b) arranged in order to communicate via at least one hydraulic line with an identical second annular space (6a, 6a, 28a, 28b) of the second hydraulic cylinder (2a, 2b, 27a, 27b), and a piston space (5a, 5b, 29a, 29b) of the first hydraulic cylinder (2a, 2b, 27a, 27b) arranged in order to communicate via at least one second hydraulic line with an identical second piston space (5a, 5b, 29a, 29b) of the second hydraulic cylinder (2a, 2b, 27a, 27b) such that as the annular space of the first hydraulic cylinder compresses the second annular space is expanded with hydraulic fluid from the at least one hydraulic line, and as the second piston space compresses the piston space of the first hydraulic cylinder is expanded with hydraulic fluid from the at least one second hydraulic line,
    a hydraulic pump (9, 10, 32, 33) arranged at least in the at least one hydraulic line (7, 8, 30, 31) between the two annular spaces (6a, 6a, 28a, 28b) or in the at least one second hydraulic line between the two piston spaces (5a, 5b, 29a, 29b), and
    at least one second hydraulic pump (9, 10, 32, 33), one of the hydraulic pumps (9, 10, 32, 33) being arranged in the at least one hydraulic line (7, 8, 30, 31) between the two annular spaces (6a, 6a, 28a, 28b), and one of the hydraulic pumps (9, 10, 32, 33) being arranged in the at least one second hydraulic line (7, 8, 30, 31) between the two piston spaces (5a, 5b, 29a, 29b).

2. The hydraulic unit as claimed in claim 1, wherein the hydraulic cylinders (2a, 2b, 27a, 27b) are configured as differential cylinders.

3. The hydraulic unit as claimed in claim 2, wherein the differential cylinders are identical.

4. The hydraulic unit as claimed in claim 1, further comprising at least one valve arrangement (34, 35), said valve arrangement (34, 35) being provided in the at least one hydraulic line or the at least one second hydraulic line which comprises the hydraulic pump (9, 10, 32, 33), and is arranged such that, in a first closed position of a valve (36, 37) of the valve arrangement (34, 35), the hydraulic liquid flows via the hydraulic pump (9, 10, 32, 33), and in a second open position of the valve (36, 37) of the valve arrangement (34, 35), the hydraulic liquid flows via the valve arrangement (34, 35).

5. The hydraulic unit as claimed in claim 4, wherein the at least one valve arrangement comprises first and second valve arrangements (34, 35), the first valve arrangement (34, 35) being arranged in the at least one hydraulic line (7, 8, 30, 31) between the two annular spaces, and the second valve arrangement (34, 35) being arranged in the at least one second hydraulic line (7, 8, 30, 31) between the two piston spaces.

6. The hydraulic unit as claimed in claim 1, further comprising at least one replenishing functional unit configured to replenish hydraulic liquid in case of a leak.

7. A steering system for an axle, comprising:
    at least two steering arms;
    at least two hydraulic cylinders, the two hydraulic cylinders (27a, 27b) are connected by way of in each case a same cylinder side to the axle and in each case by way of an other cylinder side to in each case one of the two steering arms, an annular space (6a, 6a, 28a, 28b) of the first hydraulic cylinder (27a, 27b) arranged in order to communicate via at least one hydraulic line (7, 8, 30, 31) with an identical second annular space (6a, 6a, 28a, 28b) of the second hydraulic cylinder (27a, 27b), and a piston space (5a, 5b, 29a, 29b) of the first hydraulic cylinder (27a, 27b) arranged in order to communicate via at least one second hydraulic line (7, 8, 30, 31) with an identical second piston space (5a, 5b, 29a, 29b) of the second hydraulic cylinder (27a, 27b) such that as the annular space of the first hydraulic cylinder compresses the second annular space is expanded with hydraulic fluid from the at least one hydraulic line, and as the second piston space compresses the piston space of the first hydraulic cylinder is expanded with hydraulic fluid from the at least one second hydraulic line,
    a hydraulic pump (9, 10, 32, 33) is arranged at least in the at least one hydraulic line (7, 8, 30, 31) between the two annular spaces (6a, 6a, 28a, 28b) or in the at least one second hydraulic line between the two piston spaces (5a, 5b, 29a, 29b), and
    at least one second hydraulic pump (9, 10, 32, 33), one of the hydraulic pumps (9, 10, 32, 33) being arranged in the at least one hydraulic line (7, 8, 30, 31) between the two annular spaces (6a, 6a, 28a, 28b), and one of the hydraulic pumps (9, 10, 32, 33) being arranged in the at least one second hydraulic line (7, 8, 30, 31) between the two piston spaces (5a, 5b, 29a, 29b).

8. The steering system of claim 7, wherein the axle is a second front axle that is adapted to be located rearward of a first front axle relative to a vehicle structure.

* * * * *